United States Patent [19]

Trenerry et al.

[11] Patent Number: 5,197,353

[45] Date of Patent: Mar. 30, 1993

[54] CRANK AND SPIDER ASSEMBLY FOR BICYCLE

[76] Inventors: John Trenerry; Phillip Trenerry, both of 10885 Kalama River, Unit "E", Fountain Valley, Calif. 92708

[21] Appl. No.: 738,602

[22] Filed: Jul. 31, 1991

[51] Int. Cl.$^5$ .............................................. G05G 1/14
[52] U.S. Cl. ................................ 74/594.1; 74/594.2; 280/261; 280/260
[58] Field of Search .......................... 74/594.1, 594.2; 280/261, 260

[56] References Cited

U.S. PATENT DOCUMENTS

| | | | |
|---|---|---|---|
| 529,110 | 11/1894 | Copeland | 74/594.2 O R |
| 4,425,824 | 1/1984 | Koch | 74/594.2 X |
| 4,441,383 | 4/1984 | Segawa | 74/594.2 O R |
| 4,594,910 | 6/1986 | Nagano | 74/594.2 O R |
| 4,608,878 | 9/1986 | Shimano | 74/594.2 O R |
| 4,704,919 | 11/1987 | Durham | 74/594.2 X |
| 5,010,785 | 4/1991 | Romero | 74/594.1 O R |

FOREIGN PATENT DOCUMENTS

| | | | |
|---|---|---|---|
| 0020044 | of 1893 | United Kingdom | 74/594.2 |
| 0019021 | of 1894 | United Kingdom | 74/594.2 |
| 0015289 | of 1897 | United Kingdom | 74/594.2 |

*Primary Examiner*—Leslie A. Braun
*Assistant Examiner*—Daniel Wittels
*Attorney, Agent, or Firm*—William E. Mouzavires

[57] ABSTRACT

A one-piece crank arm for a bicycle is machined from high strength aerospace aluminum 7075-T6. One end of the crank arm has a threaded boss to be fastened in threads of an associated spider. The opposite end of the crank arm has a ball with a passage therein for connecting a pedal. The passage in the ball has a closed end and an axis which extends at a slight angle with respect to the axis of the threads of the boss. For weight reduction, elongated grooves are formed on opposite surfaces of the crank arm.

14 Claims, 3 Drawing Sheets

CRANK AND SPIDER ASSEMBLY FOR BICYCLE

BACKGROUND OF INVENTION

With the introduction of beach bike and multi-geared bikes with far greater than the traditional 3, 5 or 10 gears, biking has become increasingly popular. Along with this popularity has come the demand for bikes with quality parts that are affordable. One part of the bike in particular for both off-road (mountain bikes) and racing bikes that must meet stringent criteria is the crankarm to which the pedals are affixed. In turn the pedal is connected to a sprocket which of course holds a chain on one side of the bike and affixes to the drive sprocket on the other. Since crankarms are highly stressed, excellent strength to weight ratio designs have been desired but not necessarily obtainable.

In the past crank sets of steel or cast aluminum were made. The steel cranks were heavy by nature and the cast aluminum cranks were large in cross sectional dimensions in order to compensate for the low strength of cast aluminum. Also, large dimensions of course increase the weight. Next, cold forged and heat treated cromoly cranks were produced however the weight of these units was usually in exces of 600 grams, tending to be on the heavy side for cranks.

OBJECTS OF THE PRESENT INVENTION

An object of the present invention is to provide a bicycle crank that is of high strength and yet is relatively light in weight. Included herein is such a crank that is substantially lighter than cranks of the prior art and yet possesses the requisite strength. It is a further object of the present invention to provide a crankarm that has the above characteristics and yet can be made with an efficient aerodynamic design that will naturally accommodate the foot of the bicyclist.

It is a further object of the present invention to provide a bicycle pedal crank that may be manufactured at a commercially competitive cost.

A further object of the present invention is to provide a novel and improved crank and spider assembly for a bicycle.

SUMMARY OF INVENTION

In summary the present invention provides a pedal crank on the sprocket side of the bicycle, with a threaded protruding boss for attachment to a spider which is secured to the sprocket of the bicycle. In addition, in the preferred embodiment, the crank is provided with a threaded hole adjacent the boss for receiving a fastener to be secured in a hole placed in the spider to further secure the crank to the spider.

The opposite end fo the carnk has a generally ball shape with a threaded passage to receive the pedal. In the preferred form, the ball has a closed end for strength to resist force from the bicyclist's foot. In accordance with the invention, the centerline of the threaded passage in the ball extends at an angle of 3¼° to 5° (degrees) relative to the axis of the threaded boss on the opposite end of the crank.

In the preferred embodiment lightweight material 7075-T6 high strength aerospace aluminum is used to make the crank; and grooves are formed in surfaces of the crank, for aerodynamics and weight-loss. Other features are disclosed in the detailed description below.

DRAWINGS

Other objects and advantages of the present invention will become more apparent from the following more detailed description taken in conjunction with the drawings in which.

DETAILED DESCRIPTION OF THE DRAWINGS

Figure 1:
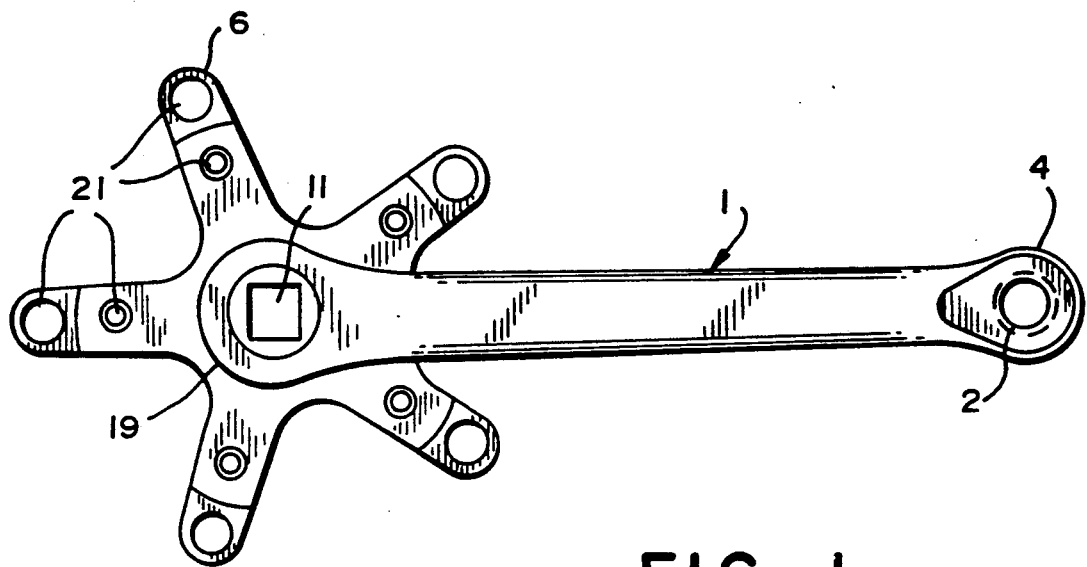
FIG. 1 is a side elevational view showing the outside surface of a right-hand crankarm shown assembled on a spider assembly.

Referring to the drawings in detail there is shown for illustrative purposes only a preferred embodiment of the invention. Referring to FIG. 1 a right-hand crank arm 1 for a bicycle sprocket is shown with a relatively closed-end-ball portion 4 and larger front end portion 19. Front end portion 19 has a standard square hole 11 formed in its center for receiving a square shaft (not shown) that runs through a spider 6 to the left-hand crank (not shown) which also has a square hole that receives the shaft. Spider 6 has mounting holes 21 used to attach the spider 6 to the sprocket (not shown) which actually holds the bike chain.

Figure 2:
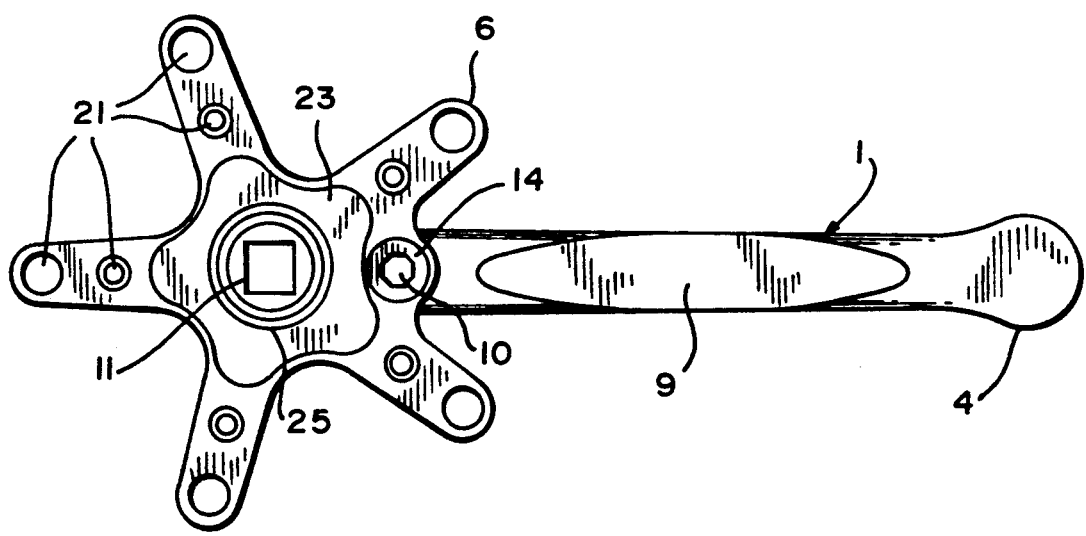
FIG. 2 is a side elevational view showing the inside surface of the right-hand crank arm and spider assembly.

As shown in FIG. 2, a groove 9 is formed on the inner surface of the crankarm 1. This groove 9 assures that there is ample clearance between the front derailleur and the crankarm, upon its being rotated. Groove 9 also aids in the reduction of weight of the crankarm 1 while increasing aerodynamic efficiency of the crankarm 1. Further weight reduction and aerodynamic efficiency is achieved in the preferred embodiment of the invention by tapered grooves 5 (FIG. 6) formed in both upper and lower surfaces of the crank arm. Only the grooves 5 are shown in FIG. 6.

Figure 6:
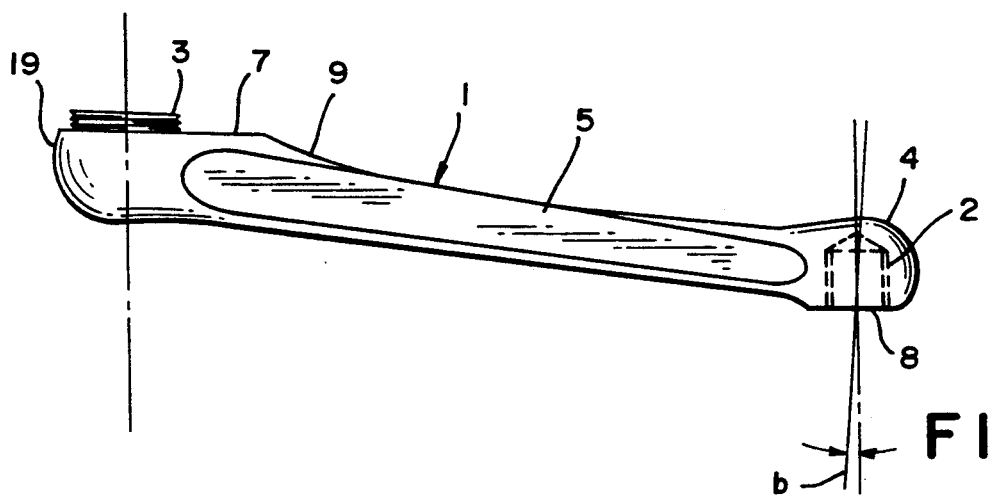
FIG. 6 is a plan view of the bottom side of the right-hand-side crank arm.
Figure 7:
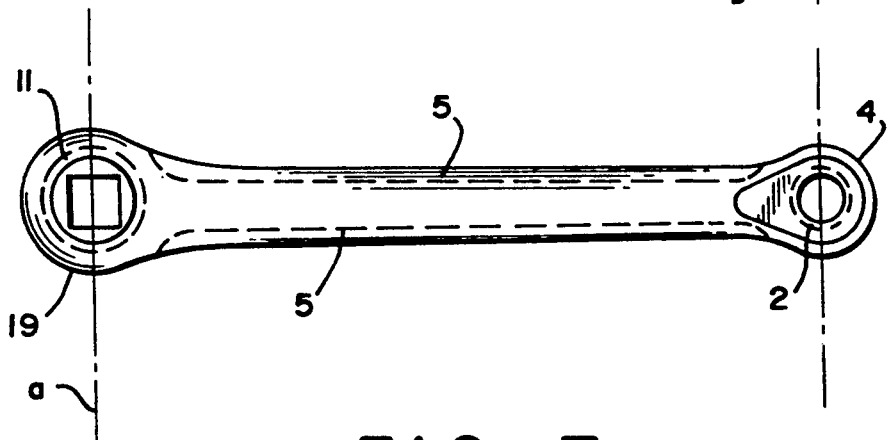
FIG. 7 is a side-elevational-view of the outside surface of the right-hand-side crankarm.

In order to connect the right-hand crankarm 1 to the spider 6, a threaded boss 3 is formed on the inside surface of the crank as shown in FIG. 6. Boss 3 is threaded into an outer side of the spider 6, as shown in FIG. 1, which has a threaded aperture 25, shown in FIG. 2, for receiving the threaded boss 3 (FIG. 6). The axis of the boss is shown at "a" in FIG. 7. As noted above, the spider 6 is attached to the sprocket by fasteners received through holes 21 and the sprocket.

Figure 3:
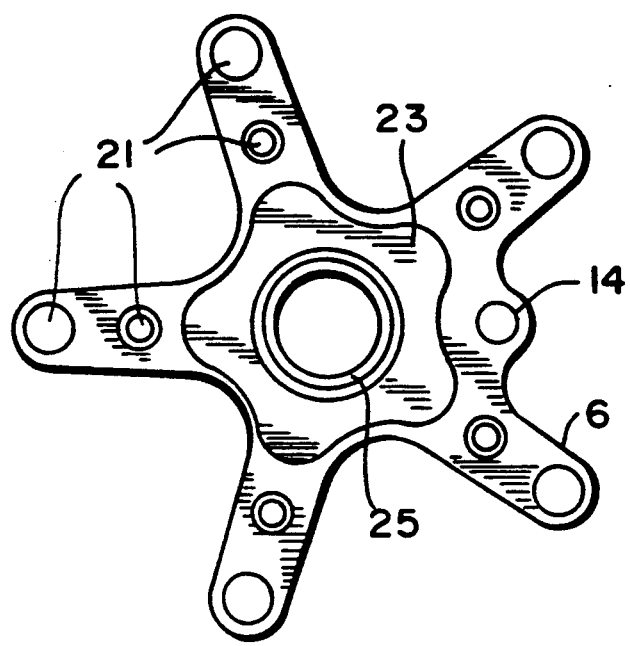
FIG. 3 is side elevational view of the inside surface of the spider.
Figure 4:
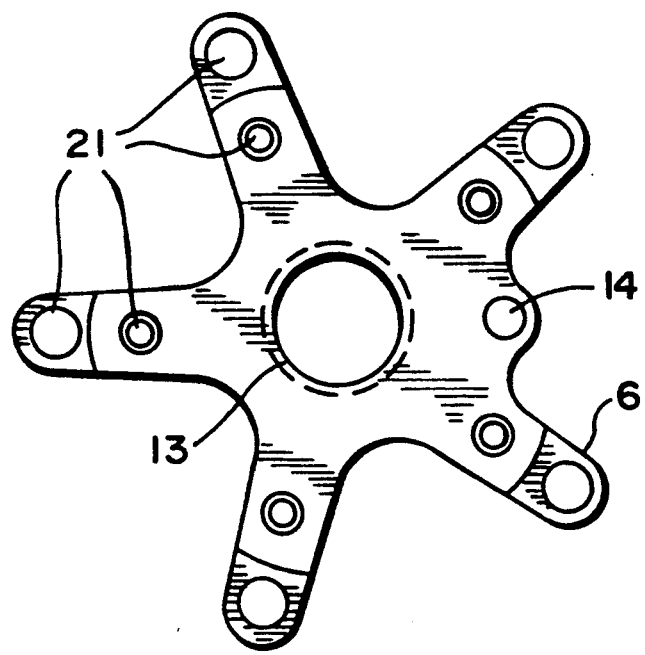
FIG. 4 is a side elevational view of the outside surface of the spider.
Figure 5:
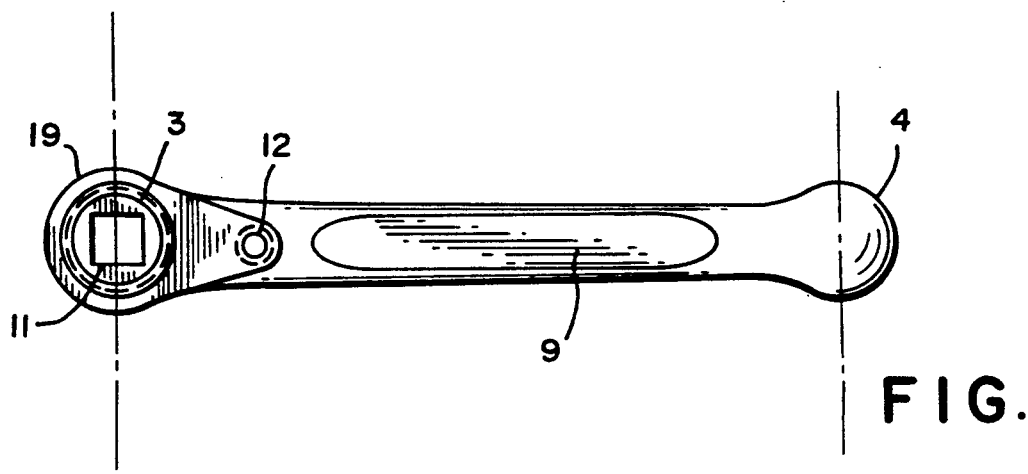
FIG. 5 is a side-elevational view of the inside surface of the right-hand crank-arm.

Additional securement means is provided for fixing the crankarm 3 to the spider 6. In the specific embodiment, a threaded hole 14 is provided through the spider 6 radially outwardly of boss 3 as shown in FIGS. 3 and 4, and a stainless steel mounting screw 10 is threaded into the hole 14 and into another threaded hole 12 (FIG. 5) located in the crankarm 1. This provides for very secure attachment of the crankarm 1 to the spider 6 and increases the resistance to foot loads The ball end 4 of the crank is used to mount the foot pedal. For this purpose the ball is provided with a threaded passage 2 extending from the outside surface and terminating short of the inside surface so that the ball is closed at one end to maintain strength. In accordance with the invention the axis "b" of the passage 2 is offset at an angle of about $3\frac{1}{2}°$ to 5° degrees relative to the axis $a^1$ which is parallel to the axis "a" of the threaded boss 3 described above. Referring to FIG. 6, a pedal-mounting surface 8 and a spider mounting surface 7 are shown. These extend at an angle of approximately $3\frac{1}{2}°$ to 5° degrees, relative to each other.

In the preferred embodiment the crankarm is manufactured from high strength aerospace aluminum 7075-T6. This type of aluminum requires machining as the method of fabrication, and computer driven (CNC) machining programs have been developed specifically to aid in the machining of this type of aluminum. This is the strongest aluminum material known and it allows the weight of the crank arm to be substantially reduced without sacrificing structural integrity and strength of the crankarm. Due to the present invention the crankarm 1 may be made in a standard size to have a weight of approximately 450 grams which is considered light.

The above description is of the right-hand crank arm 1. Since the left-hand crank arm (not shown) is not mounted to a spider and sprocket assembly it does not have the boss 3, and the attachment hole 12, but is otherwise the same as the right-hand crank described above.

Although a preferred embodiment of the present invention has been shown and described, the scope of the invention is not limited to the specific embodiment but rather is defined in the appended claims.

What is claimed is:

1. A crank for a bicycle or like vehicle, the crank having on one end fastening means including threads for connecting it to a spider or sprocket, said threads having an axis of rotation durign connection to the spider, the crank having an opposite end including a passage for connection to a pedal, said passage being closed at one end and having a central axis extending longitudinally of the passage at an acute angle and in non-parallel relationship with respect to said axis of the threads, and wherein said means is a threaded boss to be received byh the spider and includes an aperture located within the threaded boss for receiving a drive shaft to be connected to an opposite crank, and wherein said crank ha a solid body extending between and formed integral with said ends of the crank.

2. A crank as defined in claim 1 machined from including a groove on an inner surface thereof for weight loss, aerodynamic efficiency, and derailleur clearance, and grooves in opposite upper and lower surfaces thereof, for weight loss and aerodynamic efficiency.

3. A crank as defined in claim 1 manufactured of lightweight high strength aerospace aluminum 7075 - T6.

4. The crank defined in claim 1 wherein said angle is between $3\frac{1}{2}°$ and 5° degrees.

5. The crank defined in claim 1 wherein said angle is between $3\frac{1}{2}°$ to 5° degrees.

6. The crank defined in claim 5 wherein said means is a threaded boss to be received by the spider, and including a groove on an inner surface thereof for weight loss, aerodynamic efficiency, and derailleur clearance, and grooves in opposite upper and lower surfaces thereof, for weight loss and aerodynamic efficiency, and wherein said crank including said boss is machined as one piece from solid lightweight high strength aerospace aluminum 7075 - T6 and wherein said crank has a solid body extending between and formed integral with the opposite end of the crank.

7. For use with a bicycle, a spider and crank arm assembly comprising a spider and a crank, first means including a threaded boss at one end of the crank for connecting the crank to the spider; second means spaced from said first means at said one end for connecting the crank to the spider, and third means at the opposite end of the crank for connecting the crank to a pedal and wherein the spider has a threaded aperture for receiving the threaded boss, and wherein the threaded boss is free of any fastening nuts and further includes a passage extending longitudinally therein, said spider having means for securing the spider to a sprocket and wherein there is further included a shaft received through the passage of the threaded boss and through an aperture in the spider for connecting the crankl to an opposite crank, and wherein said means includes a passage extending into the crank from one surface portion of the crank but terminating short of a surface portion of the crank opposite said one surface portion such that said passage is closed at one end thereof.

8. The assembly defined in claim 7 wherein threads on said boss have an axis, and said third means includes a passage in the crank arm having an axis extending at an angle to the axis of said threads.

9. The assembly defined in claim 8 wherein said angle is between $3\frac{1}{2}°$ and 5° degrees.

10. The assembly defined in claim 8 wherein said second means includes a threaded hole which receives a screw engaged in the spider.

11. The assembly defined in claim 7 wherein said third means includes a passage extending generally transversely in the opposite end of the crank but terminating short of an outer surface of the crank such that the passage has a closed inner end.

12. The assembly defined in claim 11 wherein the crank including the threaded boss is machined in one piece of aerospace aluminum 7075-T6.

13. A crank for a bicycle having first and second opposite ends and a body portion extending between said ends, the first end having a boss projecting from one side thereof with external threads on the boss for securing the crank to an associated spider, the second end having means for securing a pedal to the crank, and wherein said means includes a passage extending into the crank from one surface portion of the crank but terminating short of a surface portion of the crank opposite said one surface portion such that said passage is closed at one end thereof and having a central axis extending longitudinally of the passage at an acute angle and is non-parallel relationship with respect to an axis of said threads, and wherein said opposite ends and body portion of the crank including said boss are machined as one piece from high strength aerospace aluminum 7075-T76 and wherein said body portion is a solid body having elongated weight-reducing grooves in external surface portions thereof between said opposite ends.

14. The crank defined in claim 13 wherein said boss has an axial passage therethrough for receiving a crankshaft.

* * * * *